United States Patent [19]
Batdorf et al.

[11] Patent Number: 5,314,719
[45] Date of Patent: May 24, 1994

[54] FUNGICIDAL PROTECTIVE COATING FOR AIR HANDLING EQUIPMENT

[75] Inventors: Vernon Batdorf, Minneapolis; William J. Brendle, Maple Grove, both of Minn.

[73] Assignee: Foster Products Corporation, Minneapolis, Minn.

[21] Appl. No.: 33,492

[22] Filed: Mar. 18, 1993

[51] Int. Cl.⁵ .............................................. C09D 5/14
[52] U.S. Cl. ................................. 427/385.5; 62/78; 106/15.05; 106/18.3; 106/18.32; 106/18.33; 106/18.34; 106/18.35; 106/18.36; 165/58; 422/37; 424/405; 424/660; 427/230; 427/239; 428/457; 514/372; 514/646; 514/709; 523/122; 524/83; 524/171; 524/172
[58] Field of Search ............... 427/230, 239, 385.5; 106/15.05, 18.3, 18.32, 18.33, 18.34, 18.35, 18.36; 165/58; 428/457; 424/660, 405; 523/122; 514/372, 646, 709; 62/78; 422/37; 524/83, 171, 172

[56] References Cited

U.S. PATENT DOCUMENTS

| | | | |
|---|---|---|---|
| 2,884,330 | 4/1959 | Goldblatt et al. | 106/17 |
| 2,984,632 | 5/1961 | Goldblatt et al. | 523/122 |
| 3,549,762 | 12/1970 | Bimber | 424/263 |
| 3,591,328 | 7/1971 | Szappanyos et al. | 427/236 |
| 3,663,616 | 5/1972 | Grivas | 260/558 S |
| 3,817,760 | 6/1974 | Brake | 106/18.32 |
| 3,817,761 | 6/1974 | Brake | 106/18.32 |
| 3,817,762 | 6/1974 | Brake | 106/18.32 |
| 3,845,212 | 10/1974 | Yovich et al. | 106/18.32 |
| 3,923,716 | 12/1975 | Powanda | 260/20.6 MM |
| 3,962,271 | 6/1976 | Sidi et al. | 548/215 |
| 3,963,682 | 6/1976 | Gindrup | 260/78 |
| 4,018,611 | 4/1977 | Cramer et al. | 106/18.32 |
| 4,039,494 | 8/1977 | Drisko | 260/22 A |
| 4,075,205 | 2/1978 | Wilson et al. | 260/250 BC |
| 4,237,019 | 12/1980 | Singer et al. | 252/47.5 |
| 4,239,541 | 12/1980 | Marek et al. | 106/15.05 |
| 4,276,211 | 6/1981 | Singer et al. | 106/18.32 |
| 4,323,602 | 4/1982 | Parker | 106/18.32 |
| 4,396,413 | 8/1983 | Miller et al. | 504/152 |
| 4,518,599 | 5/1985 | Johnston | 514/255 |
| 4,629,645 | 12/1986 | Inoue | 428/141 |
| 4,770,705 | 9/1988 | Diehl | 106/18.32 |
| 4,792,357 | 12/1988 | Bier | 106/627 |
| 4,904,504 | 2/1990 | Isozaki et al. | 427/387 |
| 5,131,939 | 7/1992 | Hsu | 106/18.32 |

FOREIGN PATENT DOCUMENTS

2040069 2/1972 Fed. Rep. of Germany ... 106/18.32

OTHER PUBLICATIONS

Abstract of BE 872920 Assignee: (ICIL) Imperial Chem Inds Ltd, Jun. 20, 1979.
Abstract of EP 318830 Inventor: Glaeser W, Jun. 7, 1989.
Abstract of EP 311892 Inventor: Kramer W; Regal E; Buchel K H; Dutzman S; Brandes W; Lurssen K, Apr. 19, 1989.
Abstract of JP58018307 Assignee: (YOSH) Yoshitomi Pharm Ind KK, Feb. 2, 1983.
Abstract of JP 56046801 Assignee: (TSUB) Kumiai Chem Ind KK, Apr. 28, 1981.
Abstract of DE 2510330 Assignee: (VAND) Vanderbilt R T Co Inc, Oct. 23, 1975.
Abstract of SU 1355630 Inventor: Egorov N S; Landau N S; Maksimova I V, Nov. 30, 1987.
Abstract of JP 63047441 Assignee: (MISE) Mitsubishi Mining Cement, Feb. 29, 1988.
Abstract of JP 63047440 Assignee: (MISE) Mitsubishi Mining Cement, Feb. 29, 1988.

(List continued on next page.)

*Primary Examiner*—Anthony Green
*Attorney, Agent, or Firm*—Vidas, Arrett & Steinkraus

[57] ABSTRACT

HVAC systems having interior surfaces exposed to moist air are protected against fungal growth by coating the interior surfaces with an adherent flexible polymer film which includes a fungicidal composition in an amount effective to provide a zone of inhibition against multiple fungal species of at least 1 mm, and which employs active fungicidal ingredients which are substantially non-volatile and non-soluble in water. Suitably the film is formed by application of a latex coating formulation, free of arsenic, mercury, lead, tin, chlorine or bromine, the formulation comprising an emulsion of a flexible polymer having suspended therein a mixture of fungicides, the fungicide mixture including a barium metaborate fungicide and a second fungicide selected from the group consisting of iodo alkynyl alkyl carbamates, diiodomethyl-p-tolylsulfone, 2-4-thiazolyl-benzimidazole, 2-n-octyl-4-isothiazolin-3-one, zinc dimethyldithiocarbamate, zinc 2-mercaptobenzothiazole, potassium n-hydroxymethyl-n-methyldithiocarbamate, sodium 2-mercaptobenzothiazole, 5-hydroxymethoxymethyl-1-aza-3,7-dioxa-bicyclooctane, 2,3,5,6-tetrachloro-4-pyridine zinc 2-pyridinethiol and N-trichloromethylthiophthalimide.

20 Claims, 1 Drawing Sheet

OTHER PUBLICATIONS

Abstract of JP 60243003 Assignee: (TOKZ) Tokyo Org Chem Ind KK, Dec. 3, 1985.

Abstract of GB 1551868 Inventor: Emblem H G; Das A K, Sep. 5, 1979.

Abstract of RO 84589 Inventor: Neagu D; Ievreienov M; Ion M, Aug. 30, 1984.

Abstract of JP 56062857 Assignee: (NIOF) Nippon Oils & Fats KK, May 29, 1981.

Publication: Air Duct Cleaning, "The Air Duct Cleaning Profession: A Matter of Quality Standards and Effective Technology", Aug. 1991, p. 27.

Publication: Architectural Paints, "Microorganisms in Paints and Coatings", no date available.

Publication: H. B. Fuller Company Technical Data Sheet for Fulatex ®PD-0449 Oct. 1, 1990.

Publication: H. B. Fuller Company Techical Data Sheet for Fulatex ®PN-3683-J Sep. 20, 1990.

Publication: Troy Chemical Corporation Technical Data Sheet for Troysan Polyphase ® AF1, no date available.

Publication: Troy Chemical Corporation Technical Data Sheet for Troysan Polyphase ® P100, no date available.

Publication: Bulletin for Busan ® 11-M1, dated Sep. 19, 1983.

Publication: Eastman Chemical Technical Data Sheet for Texanol TM, no date available.

Publication: Zinc Corporation of America Technical Sheet for ZCA Horse Head ® Zinc Oxide, no date available.

Publication: Rheox, Inc. Technical Sheet for Rheolate ® 300, dated Dec. 1991.

Publication: GAF Technical Sheet for Emulphor ® EL-719, no date available.

Publication: Rohm & Haas Company Technical Data Sheet for Tamol ® 731 Dispersant and Tamol 850 Dispersant, Feb. 1984.

FUNGICIDAL PROTECTIVE COATING FOR AIR HANDLING EQUIPMENT

BACKGROUND OF THE INVENTION

Fungicides are common ingredients in paint formulations where they are used to provide protection against mold and mildew growth in latex paint formulations and against attack by such organisms feeding on paint film polymers. Typically the effects of such fungicides in paint films are limited to the immediate surface of the film.

In U.S. Pat. No. 3,549,762 there is described an alkyd paint formulation which employs 2,4-dicyanotrichloropyridine as a biocide and which exhibits a zone of inhibition beyond the surface of the paint film in which a fungal species would not grow.

Air handling equipment is used in all types of buildings for heating, ventilating and air conditioning. This air handling equipment circulates air throughout the whole building on a continual basis. As air moves through the system, it carries with it suspended matter that gets deposited in the duct work, and builds up over time. This build-up can be dust, dirt, or grease and volatile food components from food preparation areas. Greasy substances are a particular problem, as they tend to adhere to the interior surface of the air handling equipment. Under the right conditions, this build-up can be the breeding ground for various fungus or bacteria, giving rise for some odor problems and possible serious health problems. A particularly serious problem exists when mold, bacteria or fungus is present in an isolated part of the building, and because of the air circulation system, it is distributed throughout the whole building. This is a special concern in hospitals and health care centers, as well as buildings with commercial kitchens. There are reported known instances where disease has been spread to occupants in a building through the air handling equipment.

Air handling equipment requires periodic cleaning operations in order to clean the interior surfaces as well as sanitize them with special sanitizing solutions. In some cases the equipment is actually broken into and cleaned by hand or by self-propelled moving carts that scrub the surfaces as they move through the duct work. Sanitizing solution may be fogged into one of the air inlets, with fogging continuing until a cheese cloth draped over all of the ventilators becomes wet with the fogging solution, indicating the solution has moved throughout the entire duct work. This method does not remove any matter, but only attempts to kill off any fungal or bacterial growth.

Treatment of heating, ventilation and air conditioning (HVAC) systems to control mold spores is the subject of U.S. Pat. No. 3,591,328. The procedure of this reference involves injecting an aerosol of a fungicide and a film-former in a solvent solution into the air handling system using the system's air stream to disperse the aerosol throughout the system and then dry the solvent. There is no way to be assured that 100% coverage has been obtained, and it is unlikely that a complete film would be obtained throughout the air handling system. There is also a problem of hazards associated in using a solvent-borne product in an air handling system. The building would have to be evacuated and all of the air would have to be ventilated outside for several days in order to remove all solvent vapors before the building could be reoccupied. The treatment is reported to be effective for up to ninety days after which it must be presumably repeated.

Recently it has been suggested that use of a paint containing an antimicrobial agent (INTERCEPT ®) in HVAC systems can be beneficial in reducing accumulation of mold and mildew when used in conjunction with preventative cleanings. However, this suggestion has not produced a product providing a practical long-life solution to the problem of fungal growth in HVAC systems.

SUMMARY OF THE INVENTION

Because the environment within HVAC systems is susceptible to the gradual buildup of dust and grime, it provides a media for fungal growth which is largely unaffected by the presence of a fungicide in the underlying coating film. The inventors herein have determined, however, that if a coating is used which provides a significant zone of inhibition, fungal growth can be effectively suppressed on substrates which subsequently become contaminated with dirt and grime. The coating formulations used in the invention are sprayable from either a movable apparatus that can be pulled through the equipment, or a hand held spray apparatus, and maintains good adhesion and flexibility so as not to crack or blister or peel off of the surfaces from the vibrations, temperature fluctuations and pressure changes typical in service. The preferred coating products are non-hazardous during application, and have no hazardous components that could become airborne during service.

One aspect of the invention therefore, is the provision of an adherent flexible coating on the interior surfaces of an HVAC system which is characterized by a zone of inhibition against multiple fungal species of at least 1 mm, and which employs active ingredients which are substantially non-volatile and non-leachable so as to give the product a long life of antifungal activity. An HVAC system so coated comprises a further aspect of the invention.

A still further aspect of the invention is a preferred latex coating formulation, free of arsenic, mercury, lead, tin, chlorine or bromine, the formulation comprising an emulsion of a flexible polymer having suspended therein a mixture of fungicides, the fungicide mixture including a barium metaborate fungicide and a second fungicide selected from the group consisting of iodo alkynyl alkyl carbamates, diiodomethyl-p-tolysulfone, 2,4-thiazolylbenzimidazole,2-n-octyl-4-isothiazolin-3-one, zinc dimethyldithiocarbamate, zinc 2-mercaptobenzothiazole, potassium n-hydroxymethyl-n-methyldithiocarbamate, sodium 2-mercaptobenzothiazole, 5-hydroxymethoxymethyl-1-aza-3,7-dioxabicyclooctane, 2,3,5,6-tetrachloro-4-pyridine and N-trichloromethylthiophthalimide,—In a preferred embodiment the formulation also includes a zinc oxide pigment which further enhances the antimicrobial properties of the coating film.

DESCRIPTION OF THE DRAWINGS

FIG. 1 is a perspective view of a HVAC duct having an inner coating in accordance with the invention.

FIG. 2 is a detail view of the portion of FIG. 1 encircled by broken line 2.

FIG. 3 is a detail view similar to that of FIG. 2 showing an alternative embodiment in which the coating of the invention is applied to a duct liner substrate.

DESCRIPTION OF THE PREFERRED EMBODIMENT

Figure 1:
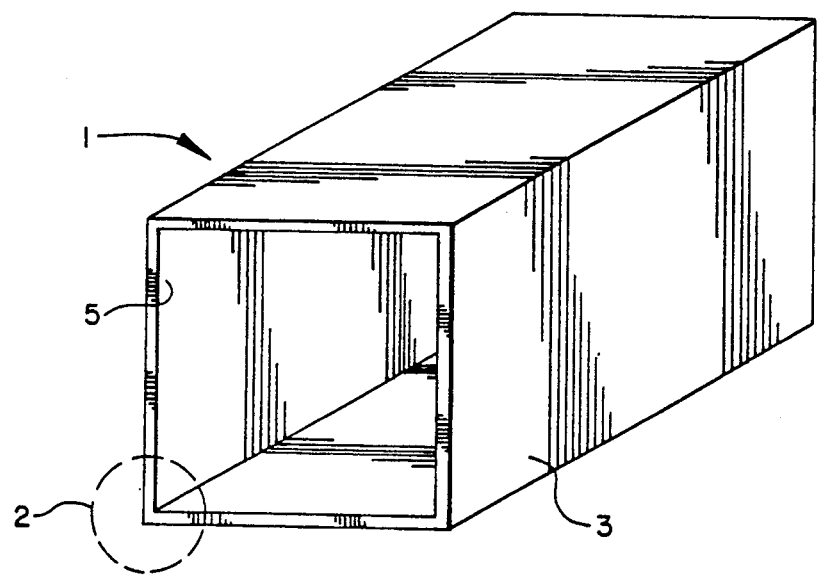

As used herein, the zone of inhibition can be determined by incubation of a film of the coating at ambient temperature for approximately 3 days in a petri dish under a suitable growth media solution (suitably 1 ml of a potato dextrose broth (Difco)) containing approximately $1 \times 10^5$ spores of the test organisms. A film is considered to provide a zone of inhibition if, after the test period, growth is not observable for a measurable distance beyond the edge of the film. The measured distance of growth inhibition corresponds to the zone of inhibition. The formulations utilized in the invention should provide a zone of inhibition of at least 1 mm against multiple fungal species. Preferably the zone of inhibition is at least 5 mm against a mixed inoculum of fungi, gram negative bacteria and gram positive bacteria.

Referring to the drawings, there is shown a portion of a HVAC duct 1 made of any suitable substrate material 3 whose interior surface has a coating 5 in accordance with the invention. Because the coating 5 has a zone of inhibition, growth of fungal or bacterial species is inhibited, not only on the surface of coating 5, but also into debris 7, e.g., dirt, dust, grease, and the like, accumulated on the interior of the duct.

Figure 2:
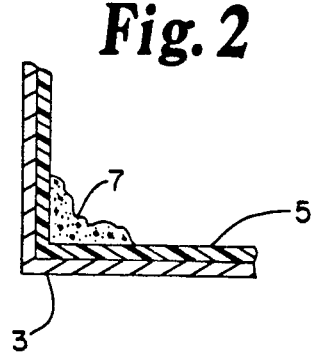
Figure 3:
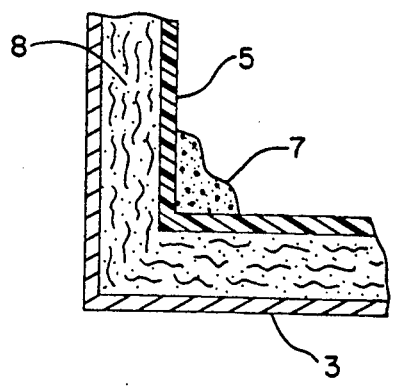

The coating may be applied directly to the interior wall 3 of the duct as shown in FIG. 2. Alternatively, the coating may be applied to a duct liner 8 which is separately installed inside the duct as shown in FIG. 3. The coating may be applied to the formed duct surfaces in service, or preapplied to HVAC system components prior to the physical formation of the duct or by the manufacturer of the duct lining material.

The preferred coating formulation for use in the invention employs an emulsion of one or more conventional binder polymers, suitably acrylic coating polymers which have good elastic properties. Examples include flexible acrylic copolymers such as EC-1658and EC-1791, sold by Rhom and Haas Company, and Fulatex ® PN-3683-J, available from H. B. Fuller Co. Adhesion promoting polymers may also be incorporated into the formulation such as AC-234 from Rohm and Haas Co and Fulatex ® PD-449 from H. B. Fuller Co. Other similar type of products could be used, as long as the polymer chosen would provide the flexibility, resistance to erosion, adhesion to the air handling equipment surfaces, sprayability, lack of hazards in use, and have the ability to provide excellent fungicidal properties with various compounded fungicides. Potential alternate polymer latexes would be styrene butadiene, styrene acrylic, vinyl acrylic, ethylene vinyl acetate copolymers and vinylidene chloride copolymers.

The fungicide which is selected should be one of very low volatility and low water solubility so that it is not rapidly leached or vaporized from the coating film. However, it is desirable that there be some very low level of water solubility or vapor pressure to allow a gradual migration of the fungicide in the film to prevent service depletion and to enhance the effectiveness of the fungicide in the zone of inhibition.

Barium metaborate is an active component of the fungicide mixture in the inventive paint formulations. A suitable commercial barium metaborate is the barium metaborate monohydrate product sold under the tradename Busan 11-M1 by Buckman Laboratories, Memphis, Tenn. This product is non-volatile and has a low water solubility (0.3% at ambient temperatures).

The second component of the fungicidal mixture is a member of the group consisting of iodo alkynyl alkyl carbamates, diiodomethyl-p-tolylsulfone, 2-4-thiazolylbenzimidazole, 2-n-octyl-4-isothiazolin-3-one, zinc dimethyldithiocarbamate, zinc 2-mercaptobenzothiazole, potassium n-hydroxymethyl-n-methyldithiocarbamate, sodium 2-mercaptobenzothiazole, 5-hydroxymethoxymethyl-1-aza-3,7-dioxa-bicyclooctane, 2,3,5,6-tetrachloro-4-pyridine, zinc 2-pyridinethiol-1-oxide and N-trichloromethylthiophthalimide. The second fungicide is needed in the formulation to provide broad spectrum fungicidal activity and the desired zone of inhibition. Desirably, the second fungicide is one which has a low water solubility, preferably <500 ppm, and a low vapor pressure, preferably $<10^{-4}$ mm Hg at 26° C.

The preferred second fungicide is 3-imido-2-propynyl butyl carbamate. This fungicide has a water solubility of 156 ppm, a vapor pressure of $<2 \times 10^{-5}$ mm Hg at 26° C. and is the active ingredient of tradename products Polyphase ® P100 and Polyphase ® AF1 sold by Troy Chemical Corp., Newark, N.J.

A practical lower limit of the preferred fungicides in the preferred formulations of the invention is approximately 2.0%, preferably 5%, barium metaborate monohydrate (as Busan 11-M1) and 0.08% 3-imido-2-propynyl butyl carbamate (0.2% Polyphase ® AF). A practical upper limit is approximately 15%, preferably 13%, barium metaborate monohydrate (as Busan 11-M1) and 0.4% 3-imido-2-propynyl butyl carbamate (1.0% Polyphase ® AF).

Zinc oxide, a multifunctional additive, may be incorporated into the formulation, if desired, at levels of 1.0–15.0%. Zinc oxide contributes to mildew resistance, provides added whiteness and hide to the coating and strengthens the film through interactions with acid groups on the acrylic polymer.

Other ingredients commonly employed in latex coating formulations may also be optionally included in conventional amounts. Such optional ingredients include, for instance, antifoam agents, dispersants, coalescing agents, pigments, fillers and reinforcing agents, thickeners, adhesion promoters, surfactants, plasticizers, flow control agents and freeze/thaw stabilizers.

An advantage of using elastic polymers is that the product tolerates the vibration and flexing normal in air handling equipment over an extended lifetime without cracking and flaking off of the surface, better than standard fungicidal paints. The elastic polymers also can be applied in a high build film, up to 30 mils wet in one application, without cracking on drying. Typical latex paints generally cannot tolerate such a high build thickness in one application because of their more rigid nature, and would crack on drying, leading to early peeling and flaking off of the surface. The preferred formulation, described in Example 1 below, is suitably applied at 5–30 mils, preferably 10–20 mils, wet film thickness, which gives sufficient film strength to the product for indefinite use as a directly applied inner liner that totally encapsulates the system. With this film thickness, the product's good erosion resistance, assures that the product would not be eroded away by moving particles in the air stream throughout the life of the system.

The fungicidal coating may be applied to the interior or exterior surfaces of HVAC systems using conventional airless spray equipment. Other conventional techniques for applying paints or coatings such as rolling or brushing may also be used. The coating may also be preapplied to HVAC system components prior to the physical formation of the duct.

If applied to an existing system, a moveable spray apparatus can be used. The coating can be sprayed from several spray tips with overlapping spray patterns in order to cover the whole inner circumference of the air handling equipment. The spray tips may be mounted on a cart that can be pulled from one end of the duct work to the other end at a given rate to obtain the thickness required for the dried film. Different applicator heads also can be used, such as a spinning fan in front of a single spray nozzle. As the product hits the spinning fan it is thrown in all directions to completely cover the inner circumference. In large ducts where an adult can walk through, it may be preferred to either use a hand held spray gun, or to apply the coating by brush or roller. After application, the product will dry very quickly from dry air movement through the equipment, especially if it is heated air. Since the coating is water based, the only effect would be that the humidity would be raised in the air being vented, allowing the building to be reoccupied in a very short time.

The invention is illustrated by the following non-limiting examples:

EXAMPLE 1

A formulation was prepared as follows, where quantities are given in parts by weight:

| (1) | FULATEX ® PN-3683J ACRYLIC COPOLYMER LATEX (60% SOLIDS, −45° C. TG) | 30.0 |
| --- | --- | --- |
| (2) | FULATEX ® PD-449 ACRYLIC COPOLYMER LATEX (60% SOLIDS, 11° C. TG) | 11.5 |
| (3) | WATER | 5.0 |
| (4) | DEFOAMER (COLLOID 646) | 0.5 |
| (5) | POLYOXYETHYLATED VEGETABLE OIL (GAF EMULPHOR EL-719) | 0.4 |
| (6) | ANIONIC DISPERSANT (ROHM & HAAS TAMOL ® 850) | 0.6 |
| (7) | COALESCING AGENT (EASTMAN CHEMICAL TEXANOL ™) | 0.7 |
| (8) | TITANIUM DIOXIDE | 6.0 |
| (9) | ALUMINA TRIHYDRATE | 14.0 |
| (10) | CALCIUM CARBONATE | 8.0 |
| (11) | ZINC OXIDE (ZINC CORP. OF AMERICA XX ®-503) | 4.0 |
| (12) | BUSAN 11-M-1 | 10.0 |
| (13) | WATER | 4.5 |
| (14) | FLOW CONTROLLER (DOW CORNING ADDITIVE 57) | 0.1 |
| (15) | MINERAL SPIRITS | 0.9 |
| (16) | DEFOAMER (COLLOID 646) | 0.5 |
| (17) | POLYPHASE ® AF-1 | 0.4 |
| (18) | ETHANOL | 0.9 |
| (19) | THICKENER (RHEOX INC. RHEOLATE ® 300) | 0.5 |
| (20) | WATER | 1.5 |

A mixer was charged with components 1-3. With the mixer running components 4-7 were added and blended until uniform. Components 8-13 were then added and mixed until smooth, after which components 14-19 were added and blended until uniform. Finally component 20 was added. Care was taken throughout to minimize air entrapment.

A sample of the polymer film was tested for a period of four weeks at 32° C. and a relative humidity of 95% against a mixed fungal inoculum in an A.S.T.M. Environmental Mold Chamber. Test organisms are *Aureobasidium pullulans*, ATCC 9348, *Aspergillus niger*, ATCC 6275 and *Penicillium* sp. ATCC 9849. At the end of the test, the surface disfigurement rating was 10 on a declining scale of 10-0, indicating that there was no growth of the test organisms on the surface of the film.

The formulation of this example gave a zone of inhibition of 9 mm against a mixed innoculum of *Penicillium funiculosum, Aspergillus niger, Staphylococcus aureus* and *Staphylococcus aureus* when tested as previously described.

In other tests this formulation was shown to prevent growth of the following fungi and bacterial species:
Fungi Forms:
  *Aspergillus flavus*
  *Penicillium funiculosum*
  *Saccharomyces cerevisiae*
  *Aureobasidium pullulans*
  *Aspergillus fumigatus*
  *Rhodotorula rubra*
  *Trichoderma reesei*
  *Gliochladium virens*
  *Aspergillus versicolor*
  *Chaetomium globosum*
  *Aspergillus niger.*
Gram-Positive Bacteria:
  *Staphylococcus aureus*
  *Listeria monocytoqenes.*
Gram-Negative Bacteria:
  *Escherichia coli*
  *Salmonella typhi*
  *Pseudomonas aeruginosa.*

This product can be spray applied at 5-30 mils wet thickness through conventional airless spray equipment, and dries to a very tough elastic film by water evaporation. It has no flash point, and very low flame spread and smoke development by actual fire tests.

EXAMPLE 2

Comparative Formulations comparative formulations were prepared using the following ingredients:

|  | A | B |
| --- | --- | --- |
| FULATEX ® PN-3683J ACRYLIC COPOLYMER LATEX (60% SOLIDS, −45° C. TG) | — | 30.0 |
| FULATEX ® PD-449 ACRYLIC COPOLYMER LATEX (60% SOLIDS, 11° C. TG) | — | 11.5 |
| RHOPLEX EC-1685 ACRYLIC COPOLYMER LATEX | 28.10 | — |
| RHOPLEX AC-234 ACRYLIC COPOLYMER LATEX | 13.00 | — |
| WATER | 11.80 | 11.0 |
| DEFOAMER (COLLOID 646) | — | 1.0 |
| DEFOAMER (DREW PLUS Y-250) | 0.96 | — |
| POLYOXYETHYLATED VEGETABLE OIL (GAF EMULPHOR EL-719) | — | 0.4 |
| ANIONIC DISPERSANT (ROHM & HAAS TAMOL ® 850) | — | 0.6 |
| COALESCING AGENT (EASTMAN CHEMICAL TEXANOL ™) | 0.73 | 0.7 |
| TITANIUM DIOXIDE | 4.9 | 6.0 |
| ALUMINA TRIHYDRATE | 19.55 | 18.4 |
| CALCIUM CARBONATE | 8.55 | 18.0 |
| ZINC OXIDE (ZINC CORP. OF AMERICA XX ®-503) | 8.55 | — |
| FLOW CONTROLLER (DOW CORNING ADDITIVE 57) | — | 0.1 |
| MINERAL SPIRITS | 2.20 | 0.9 |
| AMP-95 | 0.48 | — |
| ETHANOL | — | 0.9 |
| THICKENER (RHEOX INC. RHEOLATE ® 300) | — | 0.5 |

-continued

|  | A | B |
| --- | --- | --- |
| TRITON X-405 | 0.48 | — |
| THICKENER (NATROSOL 250 HHR) | 0.25 | — |
| POLYPHASE ® AF1 FUNGICIDE | 0.05 | — |
| INTERCEPT ® FUNGICIDE | — | 2.0 |
| TROYSAN 174 | 0.20 | — |

The formulation of Example 1 was applied to 3 gypsum wall board panels, 2 coats, fully dried, and then the panels were hung vertically in an environmental chamber at 32° C. and 98% humidity for five months. Three inches below the bottom of the panels were boxes of dirt inoculated with *Aspergillus niger, Aspergillus oryzae*, and an unidentified species of a Pencillium. At the end of the test period the three panels were rated on a scale of 10–0 per ASTM D-3274, with 10 indicating no mold growth, and 8 and 9 indicating, respectively, slight and very slight mold growth. The readings were 8, 9 and 10 for the three panels.

Comparative formulation A was tested at the same time in the same chamber. At the end of the five month period two panels showed a marginal protection rating of 6 and one hada failing rating of 5.

Comparative formulation B used a fungicide previously recommended for use in a paint for HVAC system interior surfaces. The level employed conformed to recommendations of the fungicide manufacturer. To determine the efficacy of the formulation after exposure to elevated temperatures, an elevated temperature dried paint film was placed in a petri dish inoculated with a mixture of *Asperillus niger, Saccharomyces cervisiae, Penicillium funiculosum* and *Rhodotorula rubra* fungi and *Staphylococcus aureus* ATCC 6538 and *Escherichia coli* ATCC 11229 bacteria. A film pre-dried for 7 days at room temperature and three days at 60° C. was overgrown with mold and bacteria. By contrast, the formulation of example 1 was fully resistant to growth of the fungi and bacterial inoculates under the same conditions and remained so even when pre-dried for an additional 27 day exposure to 60° C. temperature before being tested.

What is claimed is:

1. A HVAC system having an interior surface exposed to moist air, said interior surface having a film coating thereon, the coating comprising a polymer having sufficient adherence and flexibility so that the coating does not crack, blister or peel off under typical HVAC service conditions, the film being formed by application of a latex coating formulation, free of arsenic, mercury, lead, tin, chlorine and bromine, the formulation applied at a wet thickness of 5–30 mils (0.13–0.76 mm) and comprising an emulsion said of polymer having suspended therein a mixture of fungicides, the fungicide mixture including a barium metaborate fungicide and a second fungicide selected from the group consisting of iodo alkynyl alkyl carbamates, diiodomethyl-p-tolylsulfone, 2-4-thiazolylbenzimidazole, 2-n-octyl-4-isothiazolin-3-one, zinc dimethyldithiocarbamate, zinc 2-mercaptobenzothiazole, potassium n-hydroxymethyl-n-methyldithiocarbamate, sodium 2-mercaptobenzothiazole, 5-hydroxymethoxymethyl-1-aza-3,7-dioxa-bicyclooctane, 2,3,5,6-tetrachloro-4-pyridine, zinc 2-pyridinethiol-1-oxide and N-trichloromethylthiophthalimide, the fungicides being present in an amount effective to provide a zone of inhibition against mutiple fungal species of at least 1 mm.

2. A HVAC system as in claim 1 wherein the zone of inhibition is present against at least two organisms selected from the group consisting of *Aspergillus flavus, Penicillium funiculosum, Saccharomyces cerevisiae, Aureobasidium pullulans, Aspergillus fumigatus, Rhodotorula rubra, Trichoderma reesei, Gliochladium virens, Aspergillus versicolor, Chaetomium globosum* and *Aspergillus niger*.

3. A HVAC system as in claim 2 wherein the zone of inhibition is present against each of said organisms.

4. A HVAC system as in claim 1 wherein the fungicide mixture comprises a mixture of barium metaborate monohydrate and 3-imido-2-propynyl butyl carbamate.

5. A HVAC system as in claim 4 wherein said barium metaborate monohydrate is present in said latex coating formulation at a level of 5–15% and said 3-imido-2-propynyl butyl carbamate is present at a level of 0.08–0.4%.

6. A HVAC system as in claim 1 wherein the latex coating formulation is applied at a wet thickness of 10–20 mils (0.25–0.51 mm).

7. A HVAC system as in claim 1 wherein said fungicides have a vapor pressure of $<10^{-4}$ mm Hg at 26° C. and a water solubility of $\leq 0.3\%$ at ambient temperatures.

8. A HVAC system as in claim 1 wherein the latex coating formulation further comprises a zinc oxide filler in an amount of 1.0–15.0% by weight.

9. A HVAC system as in claim 1 wherein the polymer in the latex coating formulation is selected from the group consisting of acrylic, styrene-butadiene, styrene-acrylic, vinyl-acrylic, ethylene-vinyl acetate and vinylidene chloride polymers.

10. A method of protecting a surface from fungal colonization in a location subject to buildup of media for growth of fungus, the method comprising applying to the surface a latex coating formulation at a wet thickness of 5–30 mils (0.13–0.76 mm) and allowing the formulation to dry to a dried coating, the latex coating formulation being free of arsenic, mercury, lead, tin, chlorine and bromine, and comprising an emulsion of a polymer having sufficient adherence and flexibility so that the dried coating does not crack, blister or peel off under typical service conditions for said surface, said emulsion having suspended therein a mixture of fungicides, the fungicide mixture including a barium metaborate fungicide and a second fungicide selected from the group consisting of iodo alkynyl alkyl carbamates, diiodomethyl-p-tolylsulfone, 2-4-thiazolylbenzimidazole, 2-n-octyl-4-isothiazolin-3-one, zinc dimethyldithiocarbamate, zinc 2-mercaptobenzothiazole, potassium n-hydroxymethyl-n-methyldithiocarbamate, sodium 2-mercaptobenzothiazole, 5-hydroxymethyl-1-aza-3,7-dioxa-bicyclooctane, 2,3,5,6-tetrachloro-4-pyridine, zinc 2-pyridinethiol-1-oxide and N-trichloromethylthiophthalimide, the fungicides in said emulsion being present at a level sufficient to provide a zone of inhibition in the dried coating against growth of fungi of at least 1 mm.

11. A method as in claim 10 wherein the zone of inhibition is present against at least two organisms selected from the group consisting of *Aspergillus flavus, Penicillium funiculosum, Saccharomyces cerevisiae, Aureobasidium pullulans, Aspergillus fumigatus, Rhodotorula rubra, Trichoderma reesei, Gliochladium virens, Aspergillus versicolor, Chaetomium globosum* and *Aspergillus niger*.

12. A method as in claim 10 wherein said surface is in a HVAC system.

13. A method as in claim 10 wherein the latex coating formulation is applied at a wet thickness of 10-20 mils (0.25-0.51 mm).

14. A method as in claim 10 wherein the latex coating formulation further comprises a zinc oxide filler in an amount of 1.0-15.0% by weight.

15. A method as in claim 10 wherein the said fungicides have a vapor pressure of $<10^{-4}$ mm Hg at 26° C. and a water solubility of $\leq 0.3\%$ at ambient temperatures.

16. A method as in claim 10 wherein the polymer in the latex coating formulation is selected from the group consisting of acrylic, styrene-butadiene, styrene-acrylic, vinyl-acrylic, ethylene-vinyl acetate and vinylidene chloride polymers.

17. A latex coating formulation, free of arsenic, mercury, lead, tin, chlorine and bromine, the formulation comprising an emulsion of a flexible polymer selected from the group consisting of acrylic, styrene-butadiene, styrene-acrylic, vinyl-acrylic, ethylene-vinyl acetate and vinylidene chloride polymers, the emulsion having suspended therein a mixture of fungicides, the fungicide mixture including a barium metaborate fungicide and a second fungicide selected from the group consisting of iodo alkynyl alkyl carbamates, diiodomethyl-p-tolylsulfone, 2-4-thiazolyl-benzimidazole, 2-n-octyl-4-isothiazolin-3-one, zinc dimethyldithiocarbamate, zinc 2-mercaptobenzothiazole, potassium n-hydroxymethyl-n-methyldithiocarbamate, sodium 2-mercaptobenzothiazole, 5-hydroxymethoxymethyl-1-aza-3,7-dioxa-bicyclooctane, 2,3,5,6-tetrachloro-4-pyridine, zinc 2-pyridinethiol-1-oxide and N-trichloromethylthiophthalimide and the fungicides being present in the formulation at a level which is effective to provide in a dried film of said formulation a zone of inhibition of at least 5 mm against at least two organisms selected from the group consisting of *Aspergillus flavus, Penicillium funiculosum, Saccharomyces cerevisiae, Aureobasidium pullulans, Aspergillus fumigatus, Rhodotorula rubra, Trichoderma reesei, Gliochladium virens, Aspergillus versicolor, Chaetomium globosum* and *Aspergillus niger*.

18. A latex coating formulation as in claim 17 wherein the fungicide mixture comprises a mixture of barium metaborate monohydrate and 3-imido-2-propynyl butyl carbamate.

19. A latex coating formulation as in claim 18 wherein said barium metaborate monohydrate is present in said latex coating formulation at a level of 5-15% and said 3-imido-2-propynyl butyl carbamate is present at a level of 0.08-0.4%.

20. A latex coating formulation as in claim 17 further comprising a zinc oxide filler in an amount of 1.0-15.0% by weight.

* * * * *